United States Patent [19]

VanDyke

[11] 4,213,590
[45] Jul. 22, 1980

[54] HITCH HEAD HAVING MANUAL JAW UNLOCK

[75] Inventor: Ronald D. VanDyke, Florissant, Mo.

[73] Assignee: ACF Industries, Incorporated, New York, N.Y.

[21] Appl. No.: 15,560

[22] Filed: Feb. 26, 1979

[51] Int. Cl.² .............................................. B60P 7/00
[52] U.S. Cl. ...................................... 410/64; 403/316
[58] Field of Search ................. 248/119 S; 105/368 S; 403/316, 317, 330, 322

[56] References Cited

U.S. PATENT DOCUMENTS

| | | | |
|---|---|---|---|
| 2,936,983 | 5/1960 | Markestein et al. | 410/64 |
| 3,346,223 | 10/1967 | Broling | 105/368 S X |
| 3,358,954 | 12/1967 | Smith et al. | 105/368 S |
| 3,632,145 | 1/1972 | Davis | 403/13 |

Primary Examiner—Francis K. Zugel
Attorney, Agent, or Firm—Henry W. Cummings

[57] ABSTRACT

A hitch head or fifth wheel is provided including a pair of pivotable jaws which hold in place a kingpin of a highway trailer. A horizontally movable lock block, biased by a stiff spring to closed position, engages the jaws and holds them in closed position, maintaining the kingpin in place. The lock block is movable to an open position by a finger extending through an opening in the lock block. The finger is rigidly attached to a horizontally extending operating shaft which is rotatable by a handle to move the finger to an overcenter position holding the lock block in open position. The finger includes a transversely extending protrusion which is engaged by the jaws as the kingpin exits to pivot the finger from the overcenter position and allow the lock block to move to a position engaging the rear portion of the jaws, holding the jaws open until another kingpin enters the jaws and pivots the jaws to closed position.

9 Claims, 7 Drawing Figures

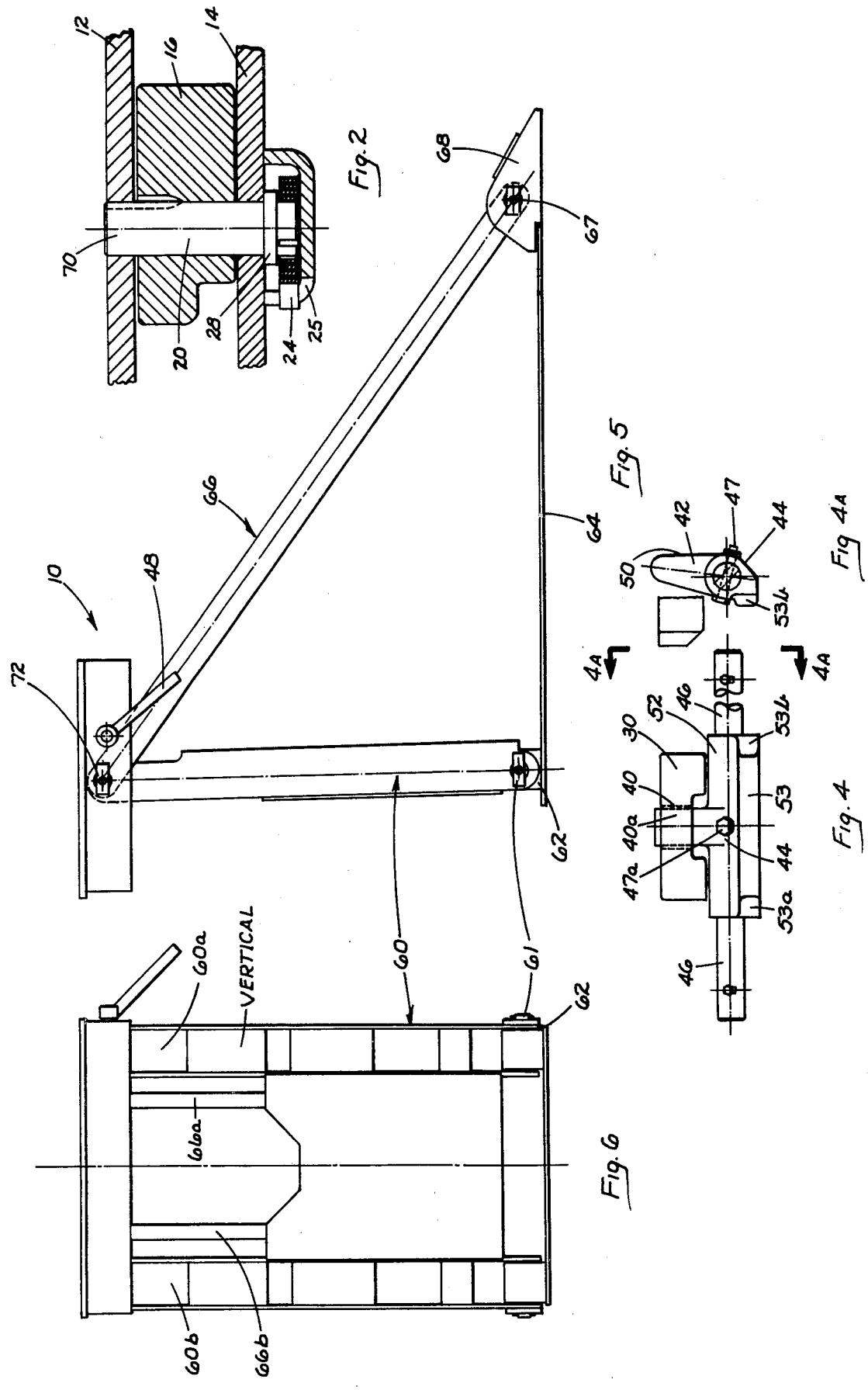

4,213,590

HITCH HEAD HAVING MANUAL JAW UNLOCK

BACKGROUND OF THE INVENTION

This invention relates to hitch heads for railway trailer hitches.

In the U.S. Pat. No. 3,632,145 (1972) a hitch head is disclosed including a horizontally movable lock block biased by a stiff spring which holds a pair of kingpin locking jaws in closed position. The lock block is manually movable to a position out of engagement with the jaws wherein vertically movable triggers hold the locking block in open position.

In application Ser. No. 009,334 filed Feb. 5, 1979, assigned to the same assignee as the present application, in a tractor operated hitch a cam or finger actuated by a bumper bar moves a lock block to a position out of engagement with a pair of locking jaws. The lock block is held in open position by a separate, manually operated rotatable keeper. This application is hereby incorporated into the present application by this reference.

SUMMARY OF THE INVENTION

A hitch head or fifth wheel is provided including a pair of pivotable jaws which hold in place a kingpin of a highway trailer. A horizontally movable lock block biased by a stiff spring to a closed position engages the jaws, holding the jaws in closed position, maintaining the kingpin in place. The lock block is movable to an open position by a finger extending through an opening in the lock block. The finger is rigidly attached to a horizontally extending operating shaft which is rotatable by a handle to move the finger to an overcenter position holding the lock block in open position. The finger includes a transversely extending protrusion which is engaged by the jaws as the kingpin exits to pivot the finger from the overcenter position and allow the lock block to move to a position engaging the rear portion of the jaws, holding the jaws open until another kingpin enters the jaws and pivots the jaws to closed position.

THE DRAWINGS

FIG. 2 is a sectional view looking in the direction of the arrows along the line 2—2 in FIG. 1;

FIG. 4 is a view looking in the direction of the arrows along the line 4—4 in FIG. 1 with the jaws removed for clarity.

FIG. 4A is a side elevational view looking in the direction of the arrows along the line 4A—4A in FIG. 4.

FIG. 5 is a side elevation view of the hitch of the present invention illustrating a vertical strut and a diagonal strut.

FIG. 6 is a front elevation view of the hitch shown in FIG. 5.

DESCRIPTION OF PREFERRED EMBODIMENTS

Figure 1:
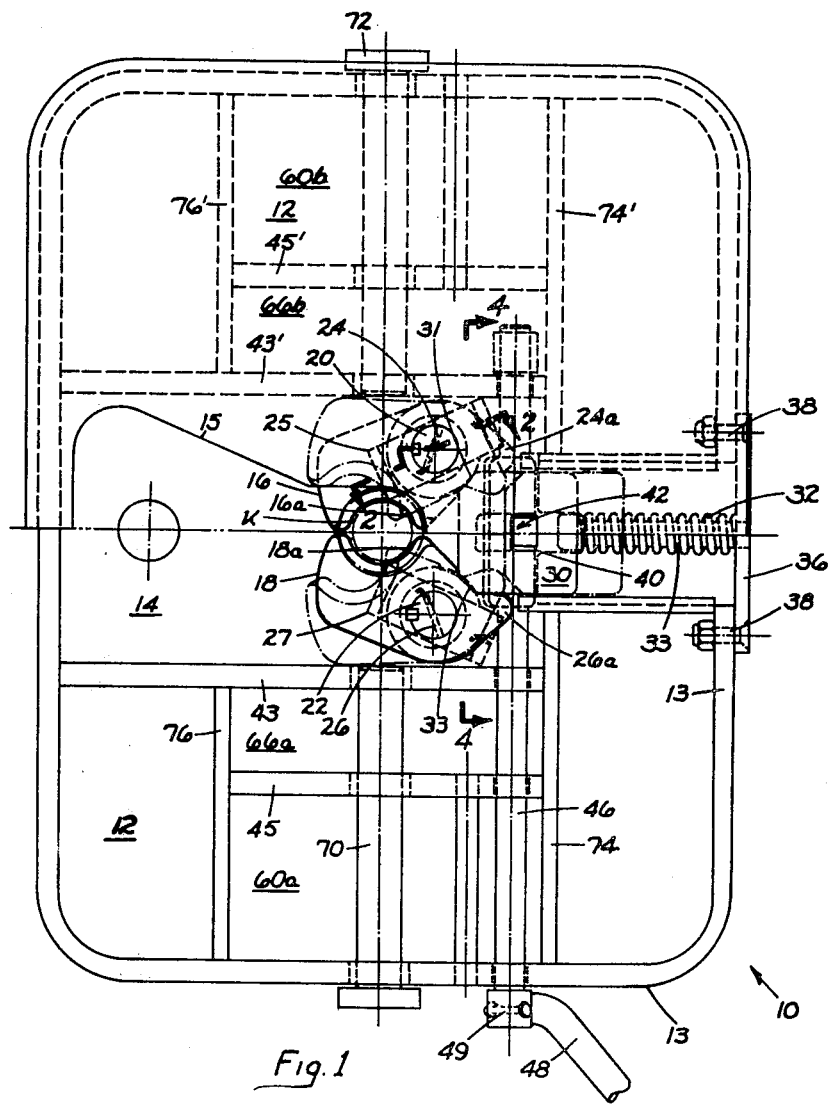
FIG. 1 is a plan view of the hitch head of the present invention.

A fifth wheel or hitch head is indicated in the drawings generally at 10. The head includes a top plate 12 having downwardly extending flanges 13 and a bottom plate 14. A loading and unloading opening 15 is provided in top place 12. A pair of jaws 16 and 18 are rigidly connected to a pair of vertically extending shafts 20 and 22. Torsion springs 24 and 26 connected to the base of the shafts bias the jaws to open position (FIG. 2). Torsion spring plates 25 and 27 cover the bottom of springs 24 and 26, and each shaft includes a shoulder 28 (FIG. 2) to hold the torsion springs in place.

A generally horizontally movable lock block 30 is biased into a closed position, engaging rear portions 31 and 33 of the jaws by means of a stiff spring 32 which engages the block 30. Spring 32 surrounds a spring shaft 33 and also engages a rear hitch plate 36 which is held in place engaging flange 13 by means of fasteners 38.

The lock block 30 is generally rectangular and includes an opening in the center portion thereof 40. A finger indicated generally at 42 includes a body portion 44 (FIG. 4) which is rigidly connected to a horizontally extending operating shaft 46 with a threaded pin 47 and a nut 47a. Shaft 46 extends transversely of the head through vertical webs 43, 43' and 45, welded to top plate 12 and through flange 13. Shaft 46 is connected to an operating handle 48 outside of the hitch head by means of a pin 49 and a nut 49a. Reinforcing webs 74, 76 and 74' and 76' are also provided which extend transversely of the head.

Figure 3:
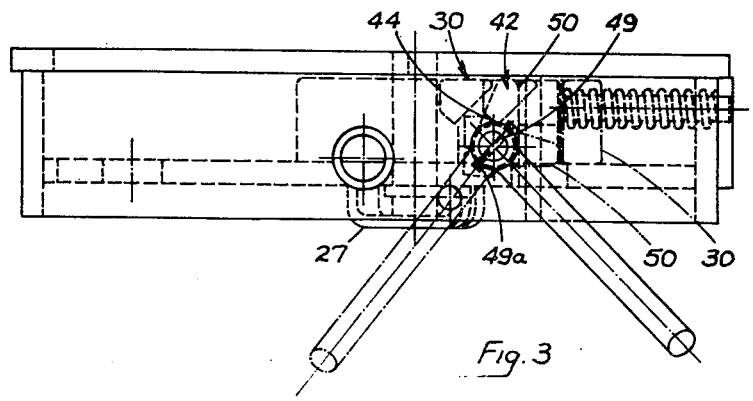
FIG. 3 is a side elevation view of the hitch head of the present invention.

Finger 42 includes a generally vertically extending tapered portion 50 (FIG. 4A) which extends upwardly through opening 40 and engages lock block 30. Finger 42 moves lock block 30 rearwardly against the bias of spring 32 to the overcenter position shown in phantom lines in FIG. 3, by actuation of operating handle 48 and shaft 46. However, movement of the lock block 30 to the rearward position does not open the jaws. The jaws are prevented from opening because the kingpin K engages the inner rear portion of the jaws 16a and 18a. The kingpin may be removed by an overhead crane.

When the kingpin is removed, jaws are free to pivot to the open position under the bias of torsion springs 24 and 26. As the jaws open, the jaws engage a protrusion 52 located upon the finger body portion 44. As shown in FIG. 4, the protrusion 52 is laterally extending between the respective jaws 16 and 18. The protrusion includes a depending cam surface 53 having end cut out portions 53a and 53b. When the jaw lugs 24a and 26a engage the protrusion 53 the finger 42 is pivoted from the overcenter position shown in phantom in FIG. 3, which enables the locking member 30 to move under the bias of the spring 32 into an engaged position with the jaw lugs 24a and 26a as shown in dotted lines in FIG. 1. The jaws then remain in this open position until another trailer kingpin engages the mouth of the jaws and pivots the same to a closed and locked position. At the same time lock block 30 again assumes a closed, engaged position between the jaws, engaging the same at 31 and 33 as shown in solid lines in FIG. 1.

The fifth wheel or hitch head of the present invention is conveniently utilized with a rigid upright hitch permanently attached to the deck of a railway flat car. As shown in FIGS. 5 and 6, such an arrangement includes a vertical strut 60 connected with removable pins 61 to a lugs 62 welded to a car deck 64 or to a base plate (not shown). In addition, a diagonal strut 66 is attached with removable pin 67 to a lug 68 also connected to the deck 64, or to a base plate (not shown).

Vertical strut 60 includes vertical beams 60a and 60b which extend into the hitch head between flange 13 and, vertical webs 45 and 45', respectively (FIG. 1). Diagonal strut 66 includes bars 66a and 66b which also extend into the head, between respective vertical webs 43 and 45 and 43' and 45'. A pair of pins 70 and 72 hold these members in place within the head.

However, the present invention is not to be limited to the rigid, permanent upright hitch. Rather, the hitch head of the present invention may also be utilized with tractor operated hitches or screw operated hitches in which opening 15 extends to the edge of top plate 12, as is well known to those skilled in the art.

What is claimed is:

1. A hitch head comprising a pair of pivotable jaws which hold in place a kingpin of a highway trailer; a horizontally movable lock block biased by a resilient means to closed position, engaging the jaws and holding them in closed position, and adapted to maintain a kingpin of a highway trailer in place; said lock block being movable to an open position by a finger extending through an opening in said lock block; said finger rigidly attached to a horizontally extending operating shaft which is rotatably mounted and adapted to move said finger to an overcenter position holding the locking block in open position; said finger including a transversely extending protrusion which is engaged by said jaws as the kingpin exits to pivot said finger from said overcenter position, and allows said lock block to move to an intermediate position engaging the rear portion of the jaws, holding the jaws in open position until another kingpin enters the jaws and pivots the jaws to said closed position.

2. A hitch head according to claim 1 wherein said jaws include rear jaw lugs which engage said transversely extending protrusion to pivot said finger from the overcenter position.

3. A hitch head according to claim 2 wherein said protrusion includes laterally spaced sloped end portions which are engaged by said rear jaw lugs to pivot said finger from said overcenter position.

4. A hitch head according to claim 2 wherein in closed position said lock block is located between said jaws, engaging rear portion of said jaws and said jaw lugs.

5. A hitch head according to claim 2 wherein said finger is tapered from said body portion toward its outer end.

6. A hitch head according to claim 2 wherein torsion springs bias said jaws to open position.

7. A hitch head according to claim 6 wherein said torsion springs are held in place with spring plates and a shoulder on vertically extending jaw pins.

8. A railway trailer hitch comprising: A hitch head including a pair of pivotable jaws which hold in place a kingpin of a highway trailer; said head including a top place having at least a pair of depending vertical webs; a vertical strut connected to said head and extending downwardly to a vertical strut mounting means located at the lower portion thereof; a diagonal strut connected to said hitch head and having mounting means located at the lower end thereof; a horizontally movable lock block biased by resilient means to closed position engaging the jaws and holding them in closed position, maintaining the kingpin in place; said lock block being movable to an open position by a finger extending through an opening in said lock block; said finger rigidly attached to a horizontally extending operating shaft which is rotatably mounted and adapted to move said finger to an overcenter position holding the locking block in open position;' said finger including a transversely extending protrusion which is engaged by said jaws as the kingpin exits to pivot said finger from the overcenter position, and allow said lock block to move to an intermediate position, engaging the rear portion of the jaws, holding the jaws in open position until another kingpin enters the jaws and pivots the jaws to closed position.

9. A railway trailer hitch according to claim 8 wherein said top plate includes an opening adapted for crane loading and unloading or trailers, and wherein said vertical strut and said diagonal strut are non-retractable.

* * * * *